United States Patent [19]

Germano et al.

[11] 4,254,554

[45] Mar. 10, 1981

[54] CONNECTION UNIT FOR MOUNTING A TOOL WITH PRECISION AND RELIABILITY ON A MACHINE, PARTICULARLY A MEASURING MACHINE

[75] Inventors: Francesco Germano, Turin; Ugo Cavicchioli, Borgaro Torinese, both of Italy

[73] Assignee: Dea Digital Electronic Automation, S.p.A., Moncalieri, Italy

[21] Appl. No.: 20,595

[22] Filed: Mar. 14, 1979

[30] Foreign Application Priority Data

Mar. 23, 1978 [IT] Italy .................. 67643 A/78

[51] Int. Cl.³ .............................................. G01B 7/30
[52] U.S. Cl. ............................ 33/174 L; 33/149 J; 33/169 R; 33/185 R
[58] Field of Search ............. 33/174 L, 185 R, 172 E, 33/174 Q, 169 R, 149 J

[56] References Cited

U.S. PATENT DOCUMENTS 4,155,171  5/1979  McMurtry ...................... 33/174 L

FOREIGN PATENT DOCUMENTS 2757453  7/1978  Fed. Rep. of Germany ........ 33/174 L
2712181  9/1978  Fed. Rep. of Germany ........ 33/172 E
2006435  5/1979  United Kingdom ................. 33/172 E

*Primary Examiner*—Willis Little
*Attorney, Agent, or Firm*—Ladas & Parry

[57] ABSTRACT

A connection unit for mounting a tool with precision and accuracy on a machine, particularly a measuring machine, but which at the same time does not provide a rigid connection between the tool and the machine so that if the tool undergoes accidental collision, it does not suffer damage, is described. The main feature of this connection unit is to comprise first and second members which can be fixed respectively to the machine and the tool, said first and second members being connected together by mutual positioning means, under the action of constraint means which allow a limited relative movement between said first and second members as a result of a displacement force exceeding a predetermined value and acting along directions and senses of movement allowed by said mutual positioning means.

22 Claims, 5 Drawing Figures

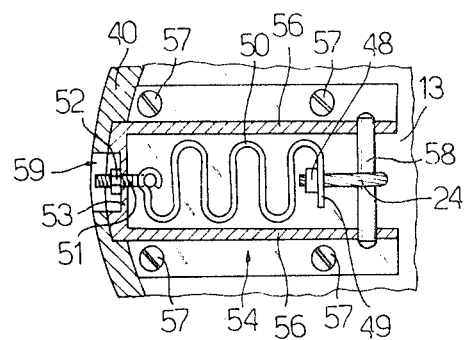
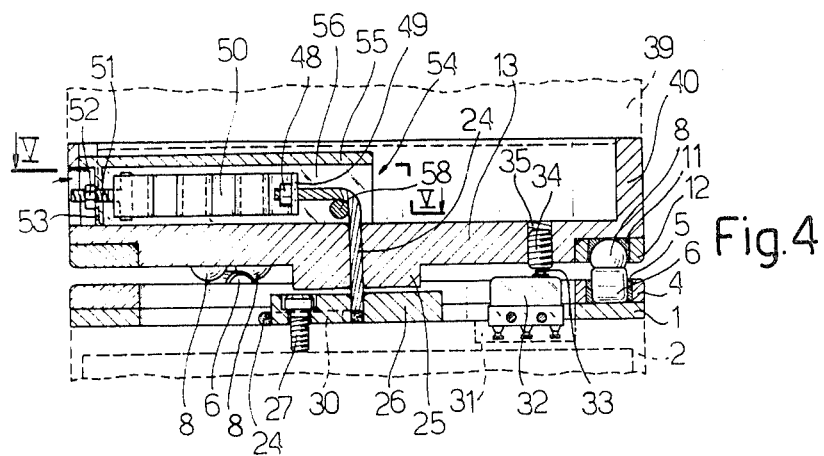
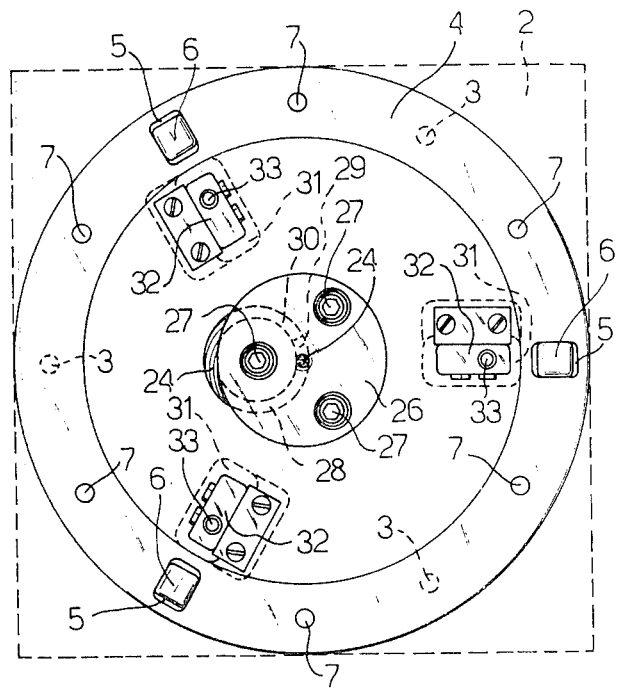

4,254,554

CONNECTION UNIT FOR MOUNTING A TOOL WITH PRECISION AND RELIABILITY ON A MACHINE, PARTICULARLY A MEASURING MACHINE

SUMMARY OF THE INVENTION

This invention relates to a connection unit for mounting a tool with precision and accuracy on a machine, particularly a measuring machine, and in general for mounting a tool on a column of the machine, possibly by way of a tool head.

At present, the tool is notably mounted on the machine either directly by way of a connection stem, or via a unit which gives rapid repeatable assembly and removal, with a precision up to an order of magnitude of about 1 micron, for example the connection unit described in Italian patent application No. 68423-A/77 of June 20, 1977 filed by the same applicant. However, in all these connection systems there is always a rigid constraint between the tool and the machine, so that if for any reason the tool collides against an obstacle with a relatively high force, damage occurs to the tool, as it is substantially rigid with the machine or is only able to make relatively small movements.

BRIEF DESCRIPTION OF THE INVENTION

The object of the present invention is to provide a connection unit which allows precision mounting of a tool on a machine, particularly a measuring machine, but which at the same time does not provide a rigid connection between the tool and machine so that if the tool undergoes accidental collision, it does not suffer damage.

The present invention provides a connection unit for mounting a tool with precision and reliability on a machine, particularly a measuring machine, wherein there are comprised first and second members which can be fixed respectively to said machine and said tool, either directly or by way of other interposed elements, said first and second members being connected together by mutual positioning means, under the action of constraint means which allow a limited relative movement between said first and second members as a result of a displacement force exceeding a predetermined value and acting along directions and senses of movement allowed by said mutual positioning means.

BRIEF DESCRIPTION OF THE DRAWINGS

The present invention will be more apparent from the description given hereinafter by way of non-limiting example of some embodiments with reference to the accompanying drawings in which:

FIG. 2 is a view on the line II—II, of the connection unit of FIG. 1;

FIG. 4 is a side sectional view of a third embodiment of the connection unit of the present invention; and FIG. 5 is a view on the line V—V, of part of the connection unit of FIG. 4.

DETAILED DESCRIPTION OF THE INVENTION

Figure 1:
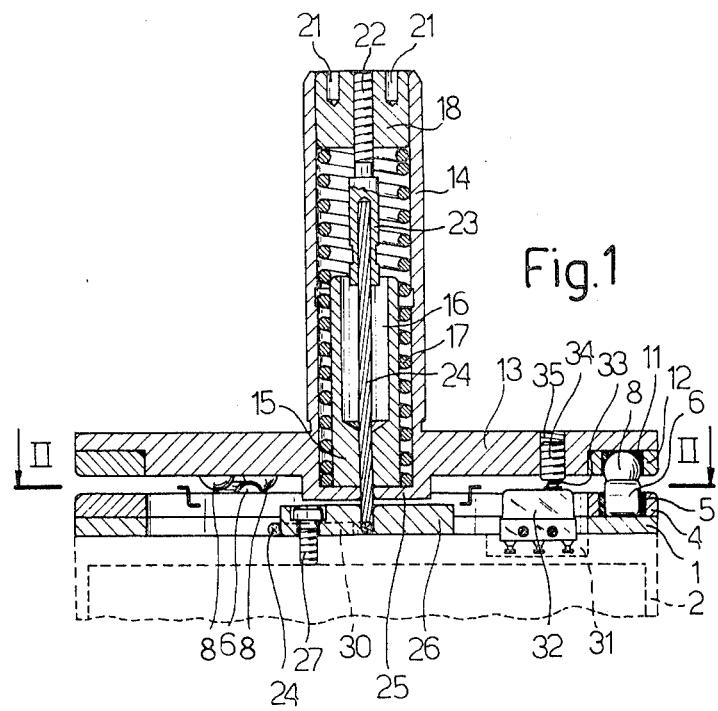
FIG. 1 is a sectional side view of a first embodiment of the connection unit of the present invention.

With reference to FIGS. 1 and 2, the connection unit of the present invention comprises an annular base flange 1, arranged for fixing on the upper face of a member 2 of a tool (indicated by dashed lines), particularly a tracer point. As shown in FIG. 2, the base flange 1 can be conveniently fixed by three screws 3. An annular flange 4 is fixed on the flange 1, and comprises three rectangular compartments 5 with their major axes disposed along three straight lines extending from the centre of the flange 4 and spaced apart by 120°. In each of the compartments 5 there is cemented a respective cylindrical roller 6, which has its axis parallel to the major axis of the relative compartment 5, and projects upperly from the flange 4. The flange 4 is also cemented on to the flange 1, and comprises six bores 7 through which the cement is made to penetrate, so that it becomes better distributed between the adjacent surfaces of the flanges 1 and 4.

A pair of balls 8 rests on each of the cylindrical rollers 6, the balls being disposed to the sides of the relative roller 6, with their centres along a direction perpendicular to the plane perpendicular to the flange 4 and containing the straight line extending from the centre of the flange 4 and passing through the axis of the relative roller 6. Each pair of balls 8 is cemented into a respective compartment 11 in an annular flange 12, from the lower surface of which the balls 8 emerge. The annular flange 12 is cemented at its top to a lower annular zone of a plate 13, from which a hollow cylindrical shank 14 projects axially upwards. This shank advantageously has a ground external surface and is suitable for coupling in known manner to the column of a measuring machine (not shown) or to a tool support head. On the base of the inner cavity of the shank 14 there rest a cylindrical member 15 with an internal cavity 16, and a cylindrical spring 17 which is external to the member 15 and has its other end resting on a plug 18 slidable in the shank 14, and upperly comprising two dead bores 21 used for screwing it to a greater or lesser degree on the threaded stem 22 of a cable terminal 23 which is connected to one end of a metal cable 24 which passes through the inner cavity 16 in the member 15, then through the base of the member 15, through a portion 25 projecting downwards in the central zone of the plate 13, and which then passes into an axial bore in a circular plate 26 fixed by three screws 27 on to the top of the body 2 of the tool. At its bottom, this plate 26 comprises two cylindrical curved cavity branches 28 and 29, such that the other end of the cable 24 is located in the bottom of the plate 26 in the branch 28, then emerges to the outside, re-entering by means of its terminal portion 30 into the branch 29. In the upper face of the tool body 2, there are provided three compartments 31 in which three microswitches 32 are fixed, and carry an upper control contact 33 with which the end of a respective dowel 34 cooperates, the dowel being screwed into a respective bore 35 provided in the plate 13.

Figure 3:
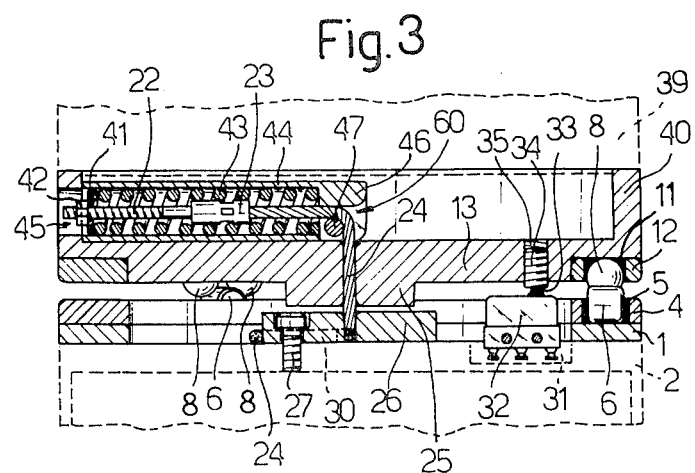
FIG. 3 is a side sectional view of a second embodiment of the connection unit of the present invention.

The connection unit of FIG. 3 differs from that shown in FIGS. 1 and 2 in that the plate 13 no longer comprises the shank 14, but instead comprises an annular upwardly directed rim 40, the purpose of which is to fix the plate 13, by means which are not shown, for example screws, to a flat bottomed part 39 (indicated by a dashed line) of a machine tool or measuring machine column. The threaded stem 22 of the cable terminal 23, which is again fixed on to one end of the cable 24, is not screwed to the plug 18 but instead passes through a disc 41 and is locked by a nut 42. One end of a cylindrical spring 43 similar to the spring 17 rests on this disc 41, but is disposed horizontally in a tube 44 fixed to the upper surface of the plate 13 in the compartment defined by the annular rim 40. The rim 40 comprises a bore 45 to give access to the nut 42 from the outside. The tube 44 therefore has a base portion 46 on which the other end of the spring 43 rests, this portion 46 also comprising an aperture 60 traversed by the cable 24, which is kept bent at 90° by a peg 47 inserted between two walls of the aperture 60 in the portion 46.

FIG. 4 shows a further embodiment of the connection unit of the present invention, which differs from that of FIG. 3 in that instead of being fixed to the cable terminal 23, the end of the cable 24 is fixed by a terminal element 48 to one end 49 of a leaf spring 50 bent into an undulated shape, its other end being fixed to a threaded stem 51 locked by a nut 52 on an end wall 53 of a frame 54 which comprises an upper wall 55 and two lateral walls 56 bent L-shaped and fixed by screws 57 to the upper face of the plate 13. A peg 58 is fixed between the two lateral walls 56 to cause the cable 24 to bend through an angle of 90°. An access aperture 59 to the nut 52 is provided in the annular rim 40 at the threaded stem 51.

The operation of the connection unit of the present invention is as follows.

With reference to the embodiment shown in FIGS. 1 and 2, the body 2 of a tool, for example a tracer point, is supported, for example by a tool support unit, by the shank 14 being connected in known manner into a corresponding cavity in the tool holder. The tool holder unit is mounted on the body 2 by coupling together the three cylindrical rollers 60 with the three pairs of balls 8, which constitute isostatic precision means for relative positioning, without excessive constraints. This coupling is not rigid, as it is determined by resilient constraint means constituted by the cable 24 which is rigidly fixed at one end to the plate 26 by being inserted into the cavity branches 28 and 29, whereas at its other end it is resiliently connected to the plate 13 by the spring 17 which is disposed between the base of the cavity in the shank 14 and the plug 18 which, by way of the threaded stem 22 of the cable terminal 23, is rigidly connected to the other end of the cable 24. Thus in this manner, under normal conditions, the spring 17 exerts a tension in the cable 24, such that the plate 26 and consequently the base flange 1 and flange 4 are urged towards the plate 13, and thus the three cylindrical rollers 6 rest on the three pairs of balls 8. However, if a displacement force exceeding a predetermined value, i.e. exceeding the normal operating value, acts on the tracer point due to accidental collision which gives rise to displacement forces in the directions allowed by said relative positioning means, i.e. in any direction with the exception of the direction along the axis of the body of the tracer point towards the column, then a relative limited displacement takes place between the elements fixed to the tool body 2 and the elements fixed to the column, so that the tracer point body 2 no longer maintains its rigid position, and thus any damage to the tracer point is prevented. In this respect, such a displacement force arising from a collision produces a greater tension in the cable 24, which by way of its connection to the plug 18 causes compression of the spring 17, which consequently displaces the plate 26 (and consequently the tool body 2) relative to the plate 13 (and consequently to the column). There is a corresponding variation in the position of at least one of the contacts 33 of the microswitches 32 relative to the corresponding dowel 34, giving rise to a corresponding opening or closure of the circuit of the microswitch 32, to generate an electrical alarm signal which is fed to the measuring machine, which generally stops the movement of the column carrying the tracer point. Conveniently, the maximum displacement which the tool 2 can make along any axis relative to the plate 13, which is determined by the maximum compression which the spring 17 can make and for which there is a limit stop given by the lower surface of the plug 18 striking against the upper edge of the cylindrical member 15, exceeds the maximum displacement which the tool can make under emergency braking conditions for the machine along the same axis. In this manner, any displacement of the tracer tool 2 due to collision will be contained within the maximum displacement values allowable, and damage to the tool will be prevented.

In addition, the predetermined value of the displacement force above which the tool body 2 moves relative to the plate 13 is conveniently greater, by a certain predetermined quantity, than the forces normally acting on the tool during its operation, and is adjusted by the preloading given to the spring 17 by means of the extent to which the plug 18 is screwed on to the threaded stem 22.

On the other hand, with the embodiment shown in FIG. 3, it is possible to connect the body 2 of a tool to a flat bottomed part 39 of a column or of another connection element. Again in this case, any displacement force on the tool body 2 which exceeds a predetermined value produces a tension in the cable 24 and a compression of the spring 43, so displacing the tool body 2 relative to the plate 13. The base portion 46 also acts as a stop for the compression of the spring 43, because of the collision against it of the cable terminal 23, and the degree of preloading of the spring 43 is adjustable by the nut 42 which adjusts the position of the disc 41 on the threaded stem 22. In particular, the part 39 can be the lower member of a connection unit for repeatable precision mounting, for example of the type described in patent application No. 68423-A/77 of June 20, 1977 of the same applicant. The safety connection unit of the present invention and the connection unit for repeatable precision mounting of the said patent application would then be connected in series between the body 2 of the tracer tool and the machine column. There is thus the advantage of having both protection against any collision of the tracer tool, and ease and rapidity of replacement of the tracer tool body by another, as a sufficient repeatability of positioning accuracy is ensured by processing under the control of a computer, including any positioning corrections as described in the said patent application.

The embodiment of FIGS. 4 and 5 is suitable for use substantially under the same conditions of application as the embodiment of FIG. 3, and its operating characteristics are the same as those described.

The advantages of the connection unit of the present invention are apparent from the aforegoing description.

Finally, it is apparent that modifications can be made to the described embodiments of the connection unit of the present invention, both to the form and arrangement of the various constituent parts, without leaving the scope of the inventive idea contained therein.

For example, instead of being constructed in the form of three rollers 6 disposed in contact with three pairs of balls 8, the mutual positioning means can be formed differently provided they result in a constraint of isostatic type, i.e. which locks the six degrees of freedom. In particular, the arrangement of known type can be used comprising a triple constraint, a double constraint and a single constraint formed preferably by one ball resting between three balls, one roller resting on two balls, and one roller resting on a plane surface. Again, said resilient constraint means could be replaced by magnetic constraint means etc.

What we claim is:

1. A connection unit for mounting a tool with precision and reliability on a machine, particularly a measuring machine, comprising first and second members which are adapted to be fixed respectively to said machine and said tool, mutual positioning means effective between said first and second members, and constraint means which comprise a substantially unextendable element locked at one end to one of said first and second members and resiliently constrained at the other end to the other of said first and second members, and which urge the first and second members together into relative positions determined by said mutual positioning means while allowing limited relative movement between said first and second members as a result of a displacement force exceeding a predetermined value and acting along directions and senses of movement allowed by said mutual positioning means.

2. The connection unit of claim 1, wherein
said mutual positioning means define an isostatic support between said first and second members.

3. The connection unit of claim 1, wherein
said mutual positioning means comprise at least one first element pertaining to one of said first or second members, disposed in contact with one or more positioning surfaces of a second element pertaining to the other of said first and second members.

4. The connection unit of claim 3, wherein
in said positioning means, said first element is disposed in contact with positioning surfaces of said second element which converge.

5. The connection unit of claim 3, wherein there are comprised three of said first elements, each disposed between a respective pair of said second elements.

6. The connection unit of claim 5, wherein
each of said three first elements is in the form of a roller.

7. The connection unit of claim 5, wherein
each of said second elements is in the form of a ball.

8. The connection unit of claim 1, wherein aid substantially unextendable element is a metal cable.

9. The connection unit of claim 1, wherein
said substantially unextendable element is locked to one of said first or second members by being inserted into cavities in the one of said first or second members.

10. The connection unit of claim 1, wherein
said substantially unextendable element is resiliently constrained at its other end to the other of said first or second members, by means of a spring.

11. The connection unit of claim 10, wherein
said spring is a cylindrical spring.

12. The connection unit of claim 10, wherein
said substantially unextendable element is resiliently constrained by means of a cable terminal fixed to one end of said element and connected to a member on which one end of said spring rests, its other end resting against said other of said first or second members.

13. The connection unit of claim 10, wherein
said spring is an undulated spring.

14. The connection unit of claim 13, wherein
said substantially unextendable element is elastically constrained by means of a cable terminal fixed to one end of said element and to one end of said spring, the other end of which is fixed to a member connected to said other of said first or second members.

15. The connection unit of claim 10, wherein there are comprised means for adjusting the preloading of said spring, and thus for establishing said predetermined value of said displacement force.

16. The connection unit of claim 10, wherein there are comprised means carried by said other of said first or second members for stopping the deformation of said spring, and thus for establishing a maximum value of the relative movement allowable between said first and second members.

17. The connection unit of claim 16, wherein
said maximum movement allowable between said first and second members, along any one of the machine axes, exceeds the maximum movement which can be made by said tool along the same axis when said machine undergoes emergency braking.

18. The connection unit of claim 17, comprising detection means disposed between said first and second members and arranged to detect any relative displacement between said first and second members and to originate an electrical control signal for activating emergency braking conditions for said machine.

19. The connection unit of claim 18, wherein
said detection means comprise at least one microswitch cooperating with a position regulator element for the contacts, said microswitch and said regulator element being disposed respectively on said first and second members.

20. The connection unit of claim 1, wherein
one of said first or second members comprises a connection shank for its connection towards said machine.

21. The connection unit of claim 1, wherein
one of said first or second members comprises a flat plate for its connection towards said machine.

22. The connection unit of claim 1, wherein one of said first or second members comprises an annular rimmed plate for its connection towards said machine.

* * * * *